United States Patent
Lee et al.

(10) Patent No.: US 11,791,543 B2
(45) Date of Patent: Oct. 17, 2023

(54) RADAR HAVING ANTENNAS ARRANGED AT HORIZONTAL AND VERTICAL INTERVALS

(71) Applicant: BITSENSING INC., Seoul (KR)

(72) Inventors: Jae Eun Lee, Seoul (KR); Hae Seung Lim, Seongnam-si (KR)

(73) Assignee: BITSENSING INC., Seoul (KR)

( * ) Notice: Subject to any disclaimer, the term of this patent is extended or adjusted under 35 U.S.C. 154(b) by 333 days.

(21) Appl. No.: 17/139,123

(22) Filed: Dec. 31, 2020

(65) Prior Publication Data

US 2022/0209396 A1    Jun. 30, 2022

(30) Foreign Application Priority Data

Dec. 28, 2020   (KR) .......................... 10-2020-0184677

(51) Int. Cl.
| | |
|---|---|
| *H01Q 1/32* | (2006.01) |
| *G01S 7/03* | (2006.01) |
| *G01S 7/41* | (2006.01) |
| *G01S 13/931* | (2020.01) |

(52) U.S. Cl.
CPC ............. *H01Q 1/3233* (2013.01); *G01S 7/03* (2013.01); *G01S 7/41* (2013.01); *G01S 13/931* (2013.01)

(58) Field of Classification Search
CPC .... H01Q 1/3233; H01Q 21/06; H01Q 21/061; H01Q 21/08; H01Q 21/10; H01Q 21/12; G01S 7/03; G01S 7/41; G01S 13/931
See application file for complete search history.

(56) References Cited

U.S. PATENT DOCUMENTS

| | | | |
|---|---|---|---|
| 6,246,365 B1 * | 6/2001 | Tokoro .................... | G01S 13/42 342/149 |
| 8,390,507 B2 * | 3/2013 | Wintermantel ........ | G01S 7/0233 342/70 |
| 8,436,763 B2 * | 5/2013 | Wintermantel ........ | G01S 7/0233 342/70 |
| 9,739,881 B1 * | 8/2017 | Pavek .................... | G01S 13/865 |
| 9,869,762 B1 * | 1/2018 | Alland .................... | H01Q 21/08 |
| 10,230,176 B2 * | 3/2019 | Natsume ............... | H01Q 1/3233 |
| 10,481,249 B2 * | 11/2019 | Alenljung ............... | G01S 7/354 |
| 10,771,124 B2 * | 9/2020 | Fang ..................... | H04B 7/0413 |
| 10,866,306 B2 * | 12/2020 | Maher .................... | G01S 13/87 |

(Continued)

FOREIGN PATENT DOCUMENTS

| | | |
|---|---|---|
| JP | H09162626 A | 6/1997 |
| KR | 1020190058072 A | 5/2019 |

(Continued)

*Primary Examiner* — Peter M Bythrow
(74) *Attorney, Agent, or Firm* — Dinsmore & Shohl LLP; Yongsok Choi, Esq.

(57) ABSTRACT

A radar includes a transmitter antenna unit including a plurality of transmitter antennas arranged in a diagonal direction based on a first horizontal interval and a first vertical interval, a receiver antenna unit including a first receiver antenna group and a second receiver antenna group arranged based on the first horizontal interval, a transceiver configured to transmit a transmission signal through the transmitter antenna unit and receive a reflection signal reflected from a target object through the receiver antenna unit and a processing unit configured to extract information about the target object by processing the received reflection signal.

13 Claims, 16 Drawing Sheets

(56) References Cited

U.S. PATENT DOCUMENTS

| | | | | |
|---|---|---|---|---|
| 11,131,749 | B2* | 9/2021 | Loesch | H01Q 21/28 |
| 11,187,795 | B2* | 11/2021 | Iwasa | H01Q 21/061 |
| 2011/0074620 | A1* | 3/2011 | Wintermantel | G01S 7/0233 |
| | | | | 342/70 |
| 2011/0074621 | A1* | 3/2011 | Wintermantel | H01Q 1/3233 |
| | | | | 342/70 |
| 2011/0080314 | A1* | 4/2011 | Wintermantel | H01Q 9/0407 |
| | | | | 342/147 |
| 2014/0062762 | A1* | 3/2014 | Kurono | G01S 7/354 |
| | | | | 342/146 |
| 2014/0306840 | A1* | 10/2014 | Koerber | H01Q 21/22 |
| | | | | 342/107 |
| 2014/0340253 | A1* | 11/2014 | Koerber | H01Q 21/061 |
| | | | | 342/146 |
| 2015/0057833 | A1* | 2/2015 | Moriuchi | G01S 7/03 |
| | | | | 343/893 |
| 2015/0253419 | A1* | 9/2015 | Alland | G01S 13/42 |
| | | | | 342/385 |
| 2015/0253420 | A1* | 9/2015 | Alland | G01S 7/03 |
| | | | | 342/156 |
| 2015/0260836 | A1* | 9/2015 | Hayakawa | H01Q 13/206 |
| | | | | 342/368 |
| 2016/0033632 | A1* | 2/2016 | Searcy | G01S 13/424 |
| | | | | 342/153 |
| 2016/0104946 | A1* | 4/2016 | Natsume | G01S 13/931 |
| | | | | 342/88 |
| 2016/0209504 | A1* | 7/2016 | Stein | G01S 3/44 |
| 2016/0282450 | A1* | 9/2016 | Kishigami | G01S 13/426 |
| 2016/0285172 | A1* | 9/2016 | Kishigami | G01S 7/023 |
| 2017/0082730 | A1* | 3/2017 | Kishigami | G01S 7/28 |
| 2017/0187102 | A1* | 6/2017 | Abe | H01Q 1/3283 |
| 2017/0276770 | A1* | 9/2017 | Lin | H01Q 25/002 |
| 2017/0307744 | A1* | 10/2017 | Loesch | G01S 13/931 |
| 2018/0149735 | A1* | 5/2018 | Lim | G01S 13/931 |
| 2018/0151958 | A1* | 5/2018 | Lim | H01Q 21/0006 |
| 2018/0151961 | A1* | 5/2018 | Lim | H04B 7/043 |
| 2019/0115670 | A1* | 4/2019 | Kishigami | G01S 13/003 |
| 2019/0195984 | A1* | 6/2019 | Goda | H01Q 21/065 |
| 2019/0207322 | A1* | 7/2019 | Ding | G01S 7/03 |
| 2019/0285738 | A1* | 9/2019 | Iwasa | G01S 7/03 |
| 2019/0293753 | A1* | 9/2019 | Iwasa | G01S 7/2813 |
| 2019/0310359 | A1* | 10/2019 | Lee | G01S 13/86 |
| 2019/0324136 | A1* | 10/2019 | Amadjikpe | G01S 13/70 |
| 2019/0391230 | A1* | 12/2019 | Loesch | G01S 13/42 |
| 2020/0072956 | A1* | 3/2020 | Lee | H01Q 21/22 |
| 2020/0191936 | A1* | 6/2020 | Witter | G01S 13/343 |
| 2020/0200866 | A1* | 6/2020 | Lynch | G01S 13/89 |
| 2020/0379083 | A1* | 12/2020 | Lee | H01Q 21/06 |
| 2021/0111479 | A1* | 4/2021 | Spalink | G01S 13/89 |
| 2022/0163623 | A1* | 5/2022 | Kishigami | H01Q 21/065 |
| 2022/0236407 | A1* | 7/2022 | Lim | H01Q 1/24 |

FOREIGN PATENT DOCUMENTS

| | | |
|---|---|---|
| KR | 1020200001534 A | 1/2020 |
| KR | 1020200047411 A | 5/2020 |

\* cited by examiner

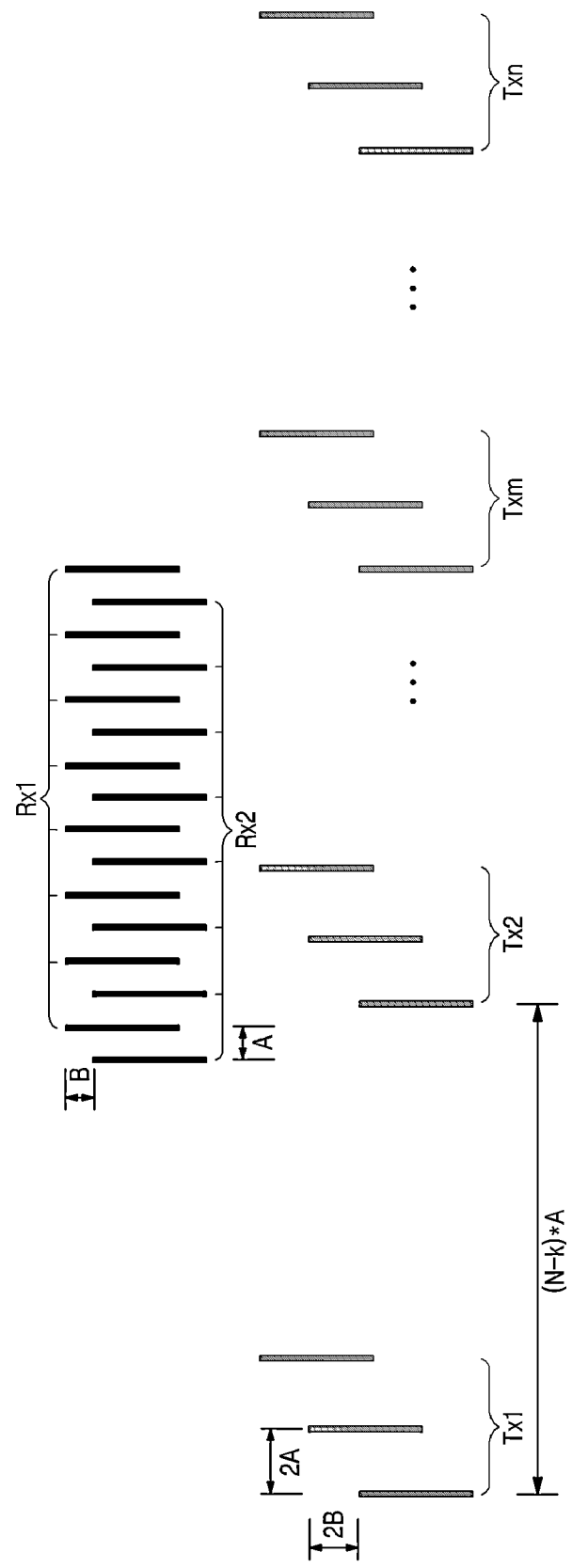

RADAR HAVING ANTENNAS ARRANGED AT HORIZONTAL AND VERTICAL INTERVALS

CROSS-REFERENCE TO RELATED APPLICATION

This application claims the benefit under 35 USC 119(a) of Korean Patent Application No. 10-2020-0184677 filed on 28 Dec. 2020, in the Korean Intellectual Property Office, the entire disclosures of which are incorporated herein by reference for all purposes.

TECHNICAL FIELD

The present disclosure relates to a radar having a plurality of antennas arranged at horizontal and vertical intervals.

BACKGROUND

In general, a radar needs to have high angular resolution to detect or track the distance, speed, and angle of a target device by transmitting and receiving electronic waves.

A conventional radar for a vehicle includes an antenna array arranged in parallel with an azimuth axis along a driving direction of the vehicle and thus can estimate the angle of an object on the road. However, since the antenna array is arranged in parallel with the azimuth axis, it is impossible to detect the angle of the object in an elevation direction.

In recent years, the radar has used an antenna pattern in which antennas are arranged in a horizontal direction to extract information for the elevation direction and antennas are additionally arranged in a vertical direction to detect a vertical angle.

However, when a horizontal angle and a vertical angle are measured separately, if there is a plurality of objects located in the same distance and moving at the same speed, it is ambiguous to distinguish the vertical angle and the horizontal angle (see FIG. 1A).

To solve this problem, the radar needs to be configured in a two-dimensional array antenna (planar array) to simultaneously extract the vertical angle and the horizontal angle.

In general, a conventional two-dimensional array antenna uses a TR module having a transmitter antenna integrated with a receiver antenna (see FIG. 1B). However, the TR module requires an expensive hardware resource and cannot be currently implemented at a high frequency of 77 GHz assigned to a vehicle.

SUMMARY

According to an exemplary embodiment, a radar may include a transmitter antenna unit including a plurality of transmitter antennas arranged in a diagonal direction based on a first horizontal interval and a first vertical interval, receiver antenna unit including a first receiver antenna group and a second receiver antenna group arranged based on the first horizontal interval, a transceiver configured to transmit a transmission signal through the transmitter antenna unit and receive a reflection signal reflected from a target object through the receiver antenna unit; and a processing unit configured to extract information about the target object by processing the received reflection signal.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described embodiments of the present disclosure, it is possible to improve angular resolution in horizontal and vertical directions for long-distance and near-field detection by efficiently arranging a plurality of transmitter antennas and a plurality of receiver antennas.

Further, according to the present disclosure, the plurality of transmitter antennas and the plurality of receiver antennas are arranged at horizontal and vertical intervals to have a horizontal offset and a vertical offset, and, thus, it is possible to precisely detect information about an object in the horizontal and vertical directions.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3C illustrates an array configuration of antennas included in the radar.

DETAILED DESCRIPTION

Figure 1A:
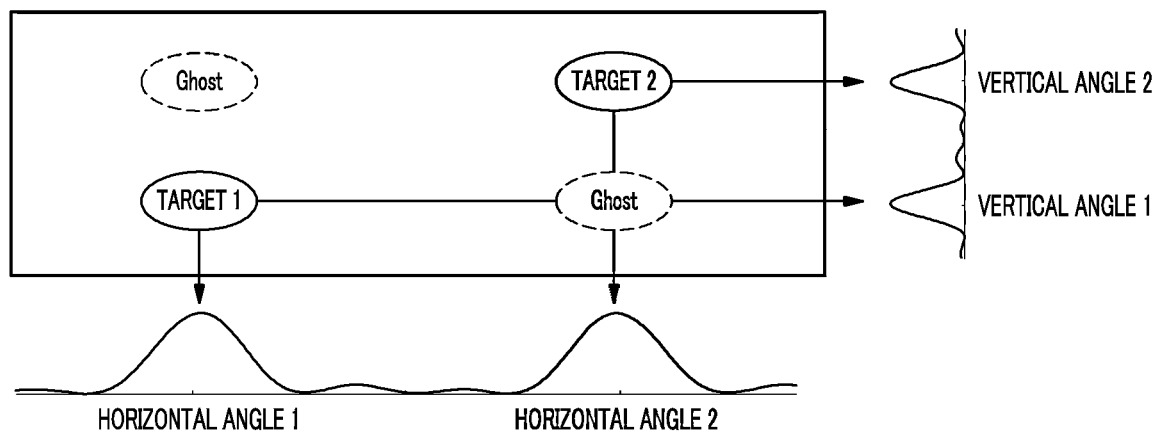
FIG. 1A is provided to explain a problem of a conventional radar.
Figure 1B:
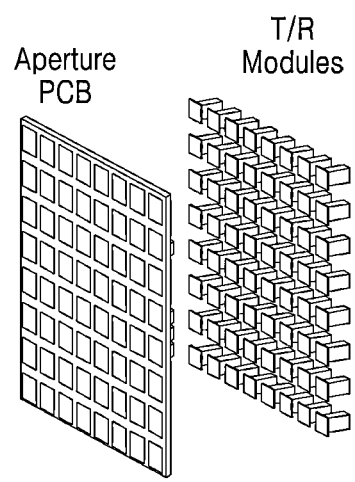
FIG. 1B is provided to explain a problem of a conventional radar.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

Figure 2:
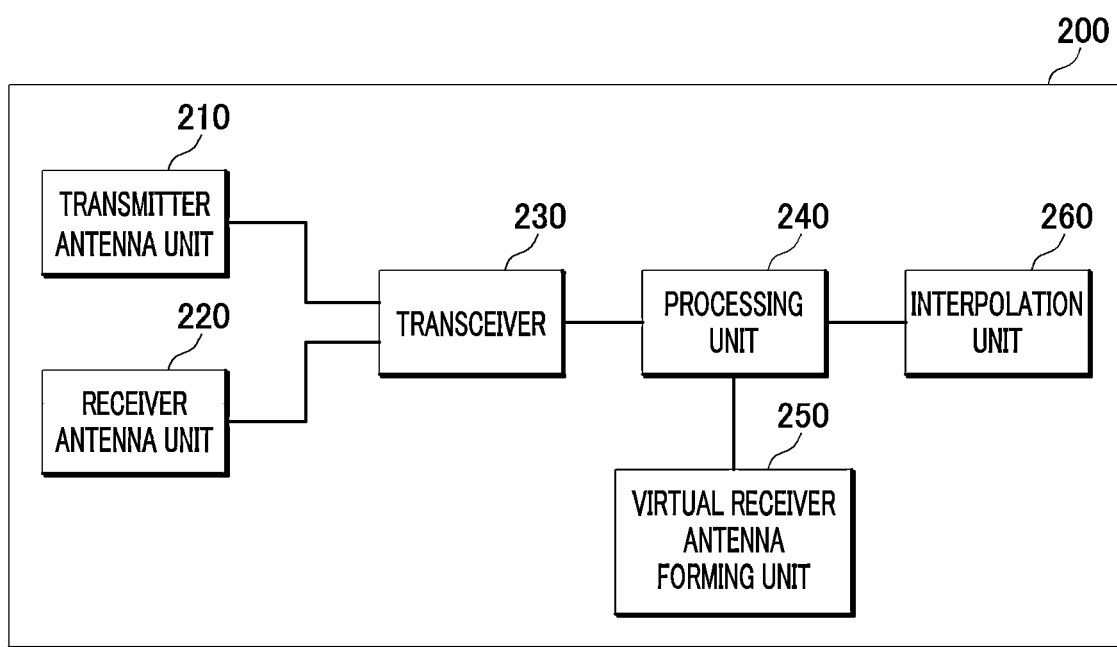
FIG. 2 is a block diagram illustrating the configuration of a radar in accordance with an embodiment of the present disclosure.

FIG. 2 is a block diagram illustrating the configuration of a radar 200 in accordance with an embodiment of the present disclosure. Referring to FIG. 2, the radar 200 may include a transmitter antenna unit 210, a receiver antenna unit 220, a transceiver 230 and a processing unit 240.

The radar 200 may be installed at a specific position of a vehicle and may transmit a transmission signal through the transmitter antenna unit 210 and receive a reception signal reflected and returning from a target object around the vehicle through the receiver antenna unit 220 to detect the presence or absence, position, direction, speed or size of the target object.

The radar 200 may use the detection result of the target object to avoid a collision with a vehicle ahead or safely change lanes and thus can accurately control a vehicle system.

The transmitter antenna unit 210 may include a plurality of transmitter antennas for transmitting a transmission signal to detect the target object.

The transmitter antenna unit 210 may include at least two transmitter antenna groups. Here, each transmitter antenna group may include a plurality of transmitter antennas arranged in a diagonal direction at a first horizontal interval and a first vertical interval or arranged in a diagonal direction which is based on the first horizontal interval and the first vertical interval. For example, the first horizontal interval may be 2*A and the first vertical interval may be 2*B. Herein, A and B may be set equal to each other (for example, each of A and B may be 0.5 lambda).

The at least two transmitter antenna groups may be arranged at an interval from each other based on the number of receiver antennas included in the receiver antenna unit 220 and the first horizontal interval. The at least two transmitter antenna groups may be arranged at an interval from each other further based on an error compensation constant (for example, natural number). For example, an interval between the transmitter antenna groups may be calculated based on Equation 1.

$$\text{Interval between transmitter antenna groups} = (N-K) * A \quad \text{[Equation 1]}$$

Herein, N represents the number of receiver antennas included in the receiver antenna unit 220, K represents the error compensation constant and A represents the first horizontal interval/2.

Figure 3A:
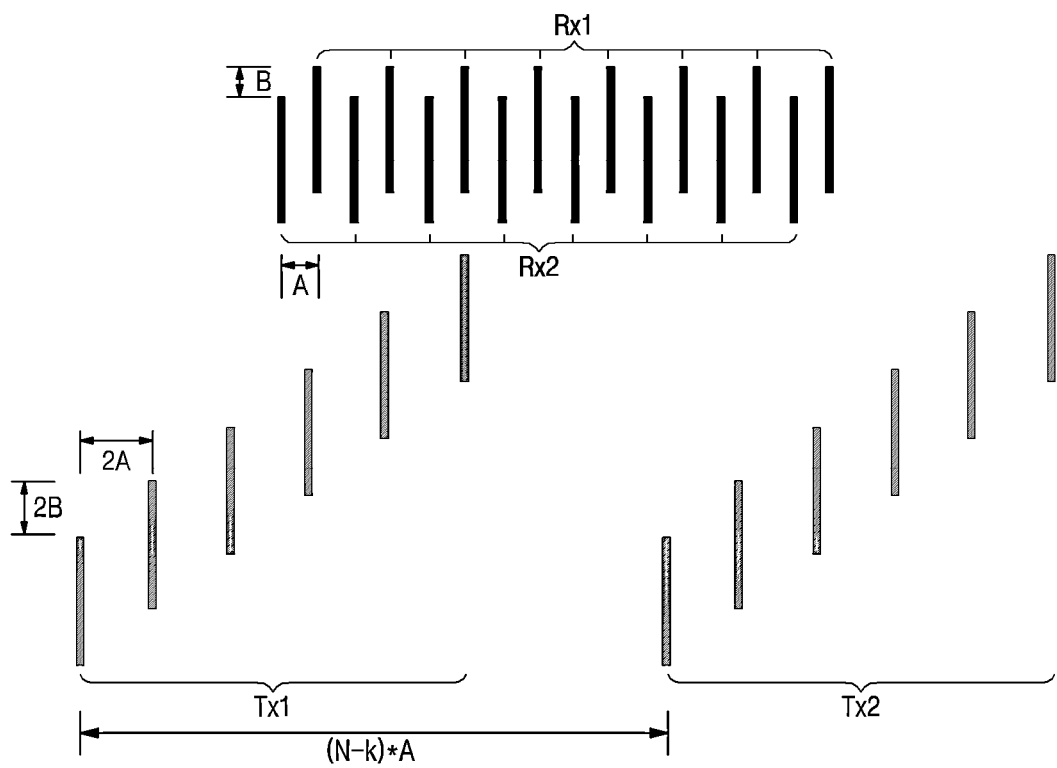
FIG. 3A illustrates an array configuration of antennas included in the radar in accordance with an embodiment of the present disclosure.

FIG. 3A illustrates a first example of an array configuration of a plurality of transmitter antennas and a plurality of receiver antennas of an antenna device included in the radar 200, and FIG. 3C illustrates a second example of an array configuration of a plurality of transmitter antennas and a plurality of receiver antennas of an antenna device included in the radar 200.

Referring to FIG. 3A, the transmitter antenna unit 210 may include a first transmitter antenna group Tx1 and a second transmitter antenna group Tx2 arranged at the first horizontal interval 2*A and the first vertical interval 2*B in the diagonal direction. Here, the first transmitter antenna group Tx1 and the second transmitter antenna group Tx2 may be arranged at an interval from each other based on the number of receiver antennas Rx1 and Rx2 and the first horizontal interval.

Referring to FIG. 3C, the transmitter antenna unit 210 may be composed of a plurality of transmitter antenna groups Tx1, Tx2, . . . , TxN arranged at the first horizontal interval 2*A and the first vertical interval 2*B in the diagonal direction. Here, the plurality of transmitter antenna groups Tx1, Tx2, . . . , TxN may be arranged at an interval from each other based on the number of the receiver antennas Rx1 and Rx2 and the first horizontal interval.

If the first transmitter antenna group Tx1 and the second transmitter antenna group Tx2 are arranged at an interval from each other based on the number of the receiver antennas Rx1 and Rx2 and the first horizontal interval as shown in FIG. 3A, the horizontal resolution may decrease by half and the vertical resolution may increase by double as compared with FIG. 3C.

If the plurality of transmitter antenna groups Tx1, Tx2, . . . , TxN is arranged at an interval from each other based on the number of the receiver antennas Rx1 and Rx2 and the first horizontal interval as shown in FIG. 3C, the horizontal resolution may increase by double and the vertical resolution may decrease by half as compared with FIG. 3A.

As such, the horizontal resolution and the vertical resolution can be adjusted by changing the size of an antenna space of the radar 200 in a horizontal direction and a vertical direction (see FIG. 3A and FIG. 3C).

The receiver antenna unit 220 may include a plurality of receiver antennas for receiving a reception signal reflected and returning from the target object around the vehicle based on a transmission signal transmitted from the transmitter antenna unit 210.

The receiver antenna unit 220 may include a first receiver antenna group and a second receiver antenna group arranged in parallel with each other in the horizontal direction at the first horizontal interval or based on the first horizontal interval. That is, a plurality of receiver antennas included in the first receiver antenna group may be arranged at the first horizontal interval in the horizontal direction and a plurality of receiver antennas included in the second receiver antenna group may be arranged at the first horizontal interval in the horizontal direction.

Referring to FIG. 3A and FIG. 3C, at least one receiver antenna included in the first receiver antenna group Rx1 and at least one receiver antenna included in the second receiver antenna group Rx2 may be alternately arranged. That is, the receiver antennas in the first receiver antenna group Rx1 and the receiver antennas in the second receiver antenna group Rx2 may be arranged in a regular zigzag pattern.

For example, if the number of the plurality of receiver antennas included in the receiver antenna unit 220 is twelve, the first receiver antenna group Rx1 may be composed of six receiver antennas and the second receiver antenna group Rx2 may be composed of six receiver antennas.

A receiver antenna of the first receiver antenna group Rx1 and a receiver antenna of the second receiver antenna group Rx2 are arranged adjacent to each other at a second horizontal interval in the horizontal direction. Here, the second horizontal interval may be at least half of the first horizontal interval. Here, the second horizontal interval is A.

A plurality of receiver antennas included in the first receiver antenna group Rx1 may be arranged at the first horizontal interval in the horizontal direction, and a plurality of receiver antennas included in the second receiver antenna group Rx2 may be arranged at the first horizontal interval in the horizontal direction. Here, the first horizontal interval may be at least double of the second horizontal interval.

A receiver antenna of the first receiver antenna group Rx1 and a receiver antenna of the second receiver antenna group Rx2 arranged adjacent to each other may be arranged to have a vertical offset based on a second vertical interval. Here, the second vertical interval may be at least half of the first vertical interval. Here, the second vertical interval is B.

In the above-described antenna array pattern of the radar 200, the transmitter antenna unit 210 and the receiver antenna unit 220 can be arranged not to overlap with each other.

Figure 3B:
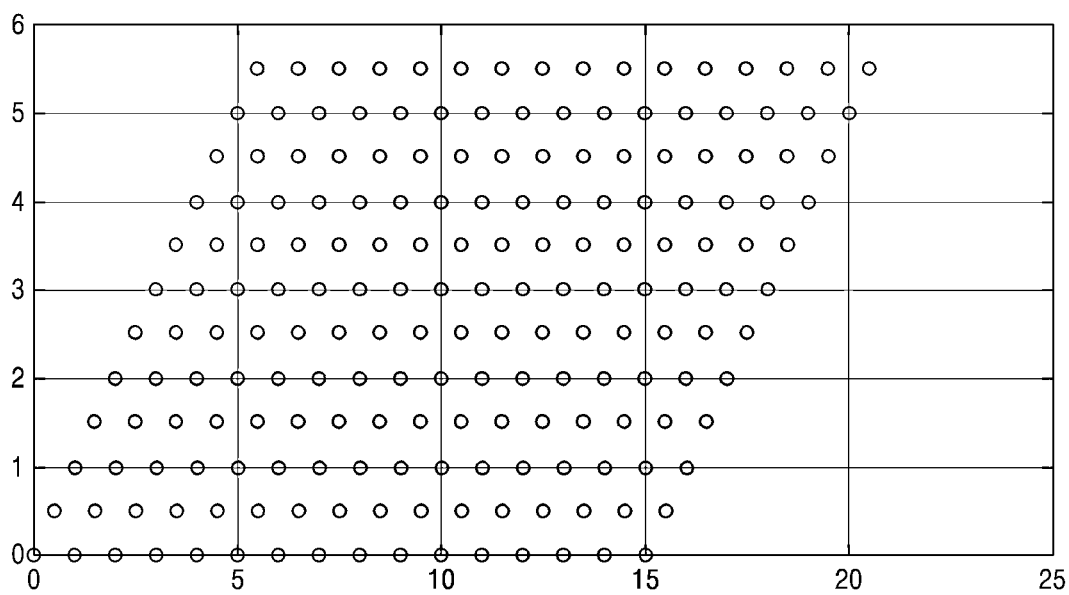
FIG. 3B illustrates a planar array in accordance with an embodiment of the present disclosure.

If multiple-input and multiple-output (MIMO) operations are performed through the antenna array configuration shown in FIG. 3A, the planar antenna array configuration shown in FIG. 3B can be formed. That is, if a MIMO virtual array is implemented using the antenna array configuration shown in FIG. 3A, a planar antenna array configuration can be formed. In the planar antenna array configuration, angles in the vertical direction and the horizontal direction can be simultaneously detected.

Referring to FIG. 3B, the planar antenna array is configured as a series of triangular lattices.

When MIMO operations of an imaging radar having a plurality of transmitter antennas and a plurality of receiver antennas are configured, a uniform linear array is applied to the antenna array configuration of the present disclosure. Thus, it is possible to improve the level of a side lobe.

If the error compensation constant (K in Equation 1) is an even number equal to or greater than a threshold value determined based on the number of receiver antennas included in the receiver antenna unit 220 and the number of transmitter antennas included in the transmitter antenna unit 210, at least two transmitter antennas respectively included in different transmitter antenna groups may overlap in position with each other.

Figure 4A:
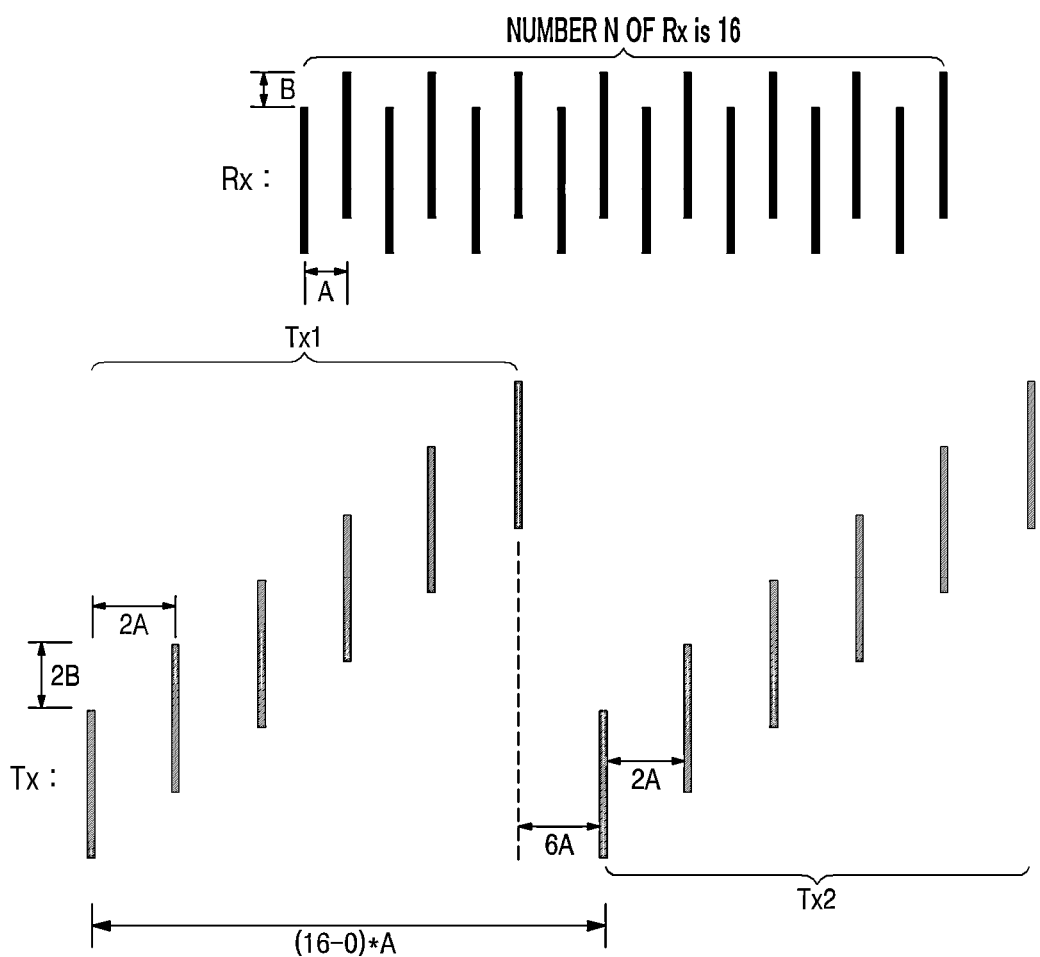
FIG. 4A illustrates an example of an array configuration of antennas depending on an error compensation constant in accordance with an embodiment of the present disclosure.

For example, referring to FIG. 4A, if the number N of receiver antennas included in the receiver antenna unit 220 is sixteen and the error compensation constant K is set to zero, a plurality of transmitter antennas included in the first transmitter antenna group Tx1 does not overlap in position with a plurality of transmitter antennas included in the second transmitter antenna group Tx2.

Figure 4B:
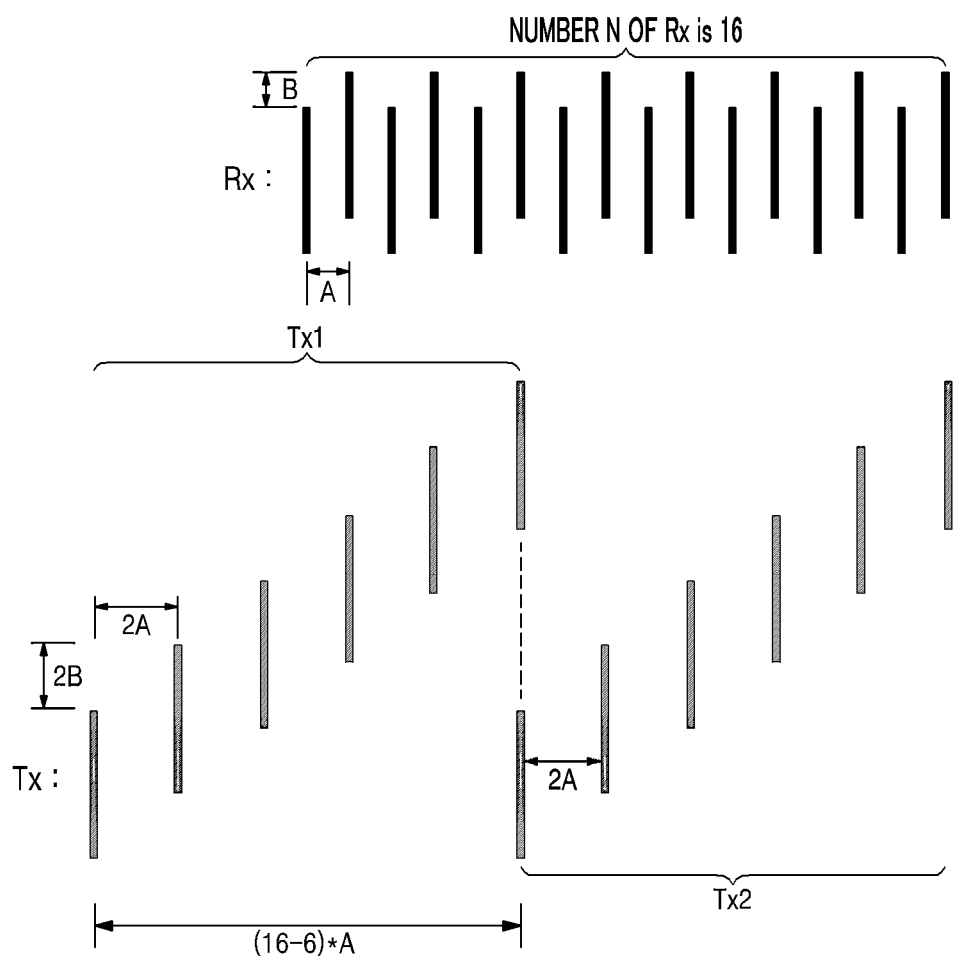
FIG. 4B illustrates an example of an array configuration of antennas depending on an error compensation constant in accordance with an embodiment of the present disclosure.

Referring to FIG. 4B, if the number N of receiver antennas included in the receiver antenna unit 220 is sixteen and the error compensation constant K is set to six, one transmitter antenna included in the first transmitter antenna group Tx1 overlaps in position with another transmitter antenna included in the second transmitter antenna group Tx2.

Figure 4C:
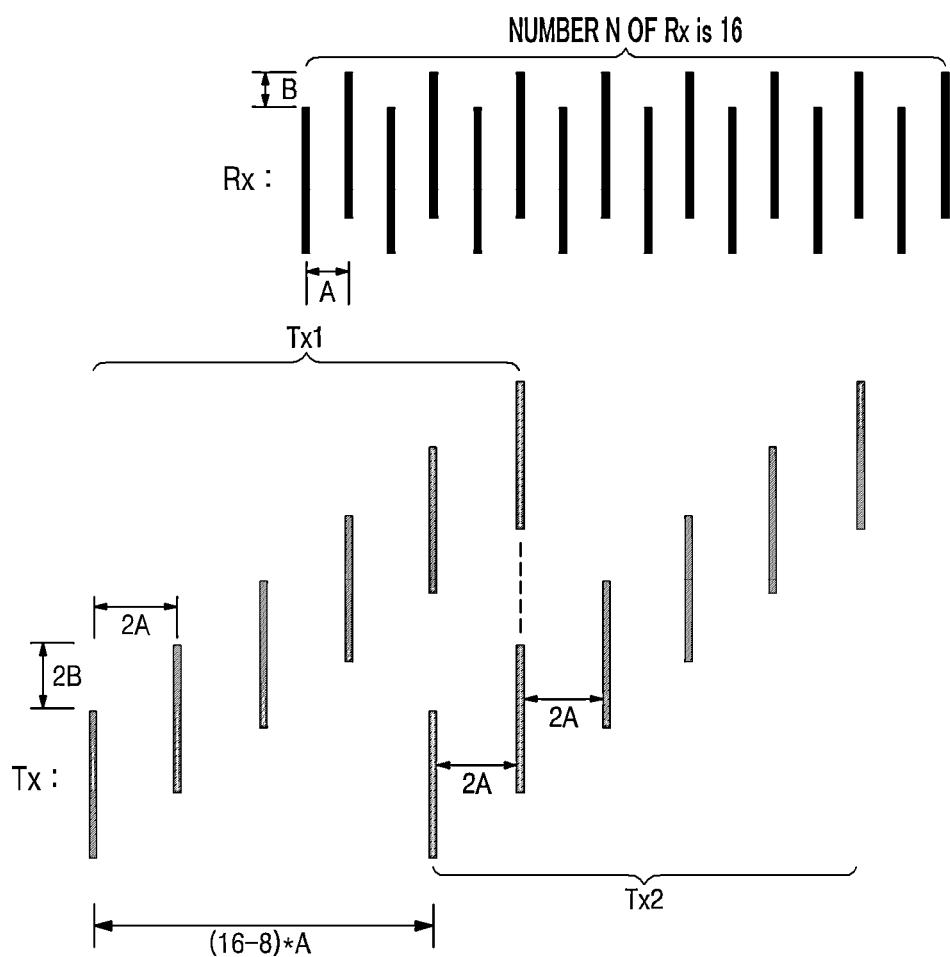
FIG. 4C illustrates an example of an array configuration of antennas depending on an error compensation constant in accordance with an embodiment of the present disclosure.

Referring to FIG. 4C, if the number N of receiver antennas included in the receiver antenna unit 220 is sixteen and the error compensation constant K is set to eight, two transmitter antennas included in the first transmitter antenna group Tx1 overlap in position (for example, position in the horizontal plane) with other two transmitter antennas included in the second transmitter antenna group Tx2.

Since at least two transmitter antennas included in the respective transmitter antenna groups overlap in position with each other as shown in FIG. 4B and FIG. 4C, an error between reflection signals corresponding to transmission signals from the respective transmitter antenna groups can be compensated for. Here, received signals corresponding to the two overlapping transmitter antennas may have the same physical position. Therefore, these signals theoretically have the same phase, but may have different values due to noise caused by various external environmental factors. Accordingly, error compensation can be performed based on the fact that the received signals corresponding to the two overlapping transmitter antennas have the same phase when there is no error. For example, an error compensation constant (a=(phase value of a received signal corresponding to a transmitter antenna overlapping with a reference transmitter antenna)/(phase value of a received signal corresponding to the reference transmitter antenna) between the respective received signals corresponding to the two transmitter antennas can be extracted, and error compensation can be performed by applying the extracted error compensation constant to an antenna group including the transmitter antenna overlapping with the reference transmitter antenna.

Figure 5A:
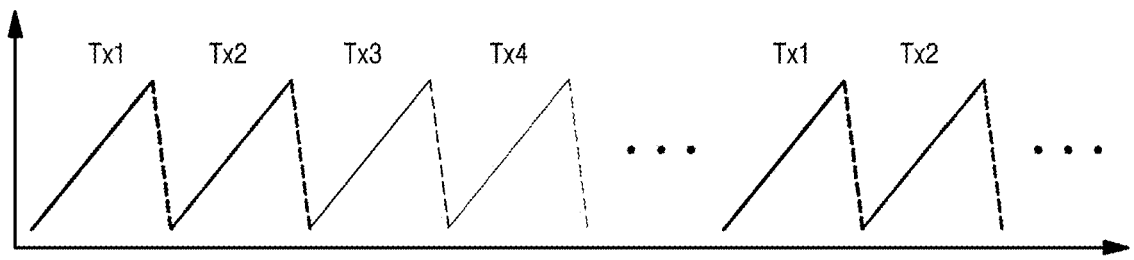
FIG. 5A shows the result of detecting signal waveform by the radar in accordance with an embodiment of the present disclosure.

The transceiver 230 may transmit a transmission signal through the transmitter antenna unit 210 and receive a reflection signal reflected from the target object through the receiver antenna unit 220. For example, referring to FIG. 5A, the transceiver 230 may transmit transmission signals rapidly at regular intervals through the transmitter antenna unit 210 by a first transmission method (for example, fast-chirp TDMA method) and receive reflection signals reflected from the target object through the receiver antenna unit 220.

Figure 5B:
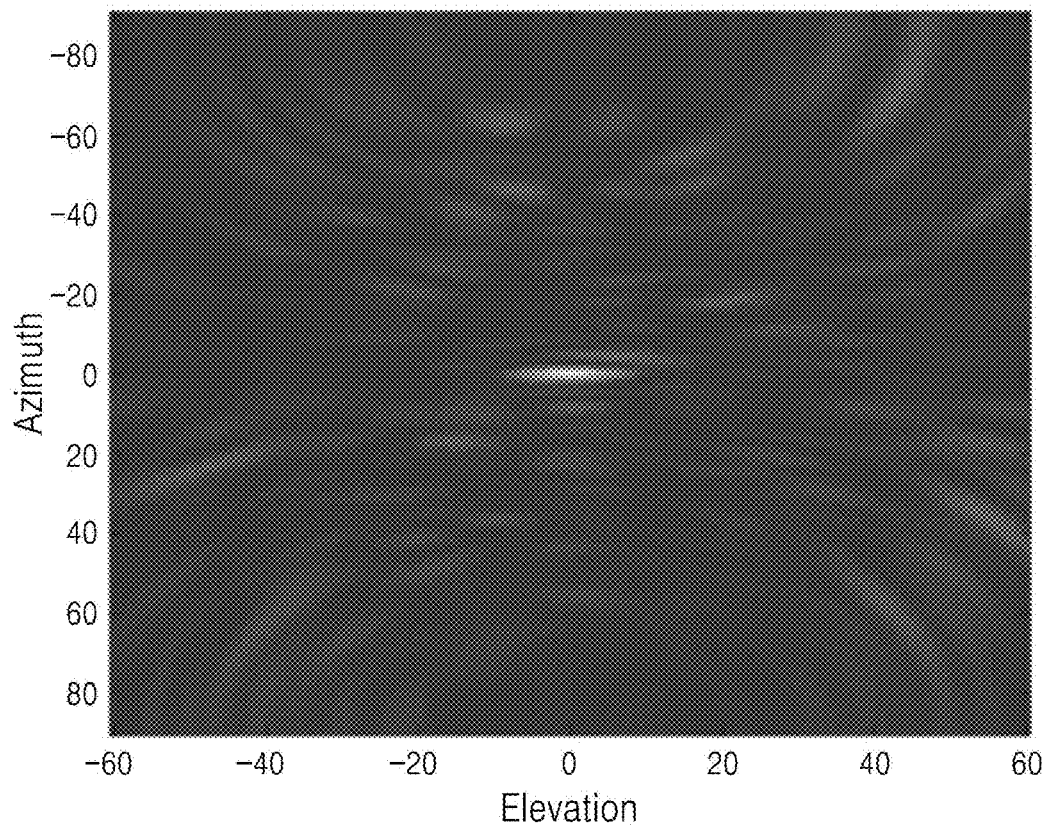
FIG. 5B shows the result of detecting verticality by the radar in accordance with an embodiment of the present disclosure.

The processing unit 240 may extract information about the target object by processing the reflection signals reflected from the target object. For example, the processing unit 240 may obtain, from the received reflection signals, vertical information, such as the height of the target object, and horizontal information, such as the width of the target object. For example, referring to FIG. 5B, the processing unit 240 may estimate an azimuth angle and an elevation angle of the target object from the position with the highest intensity of a reflection signal.

When the processing unit 240 performs MIMO operations through at least two transmitter antenna groups, a virtual receiver antenna forming unit 250 may form virtual receiver antennas arranged at a predetermined horizontal interval in the same horizontal direction as a plurality of receiver antennas included in the receiver antenna unit 220.

For example, when a first transmitter antenna Tx1 and a second transmitter antenna Tx2 transmit identical transmission signals at the same time, receiver antennas configured to receive reception signals reflected and returning from the target object based on the transmission signals can have the same effect as if they were spatially shifted by a predetermined horizontal interval (i.e., horizontal interval N*A between the first transmitter antenna Tx1 and the second transmitter antenna Tx2) in the horizontal direction and received the identical reception signals. In other words, receiver antennas spatially shifted by the predetermined horizontal interval in the horizontal direction may receive reception signals identical or analogous to signals received by receiver antennas that is not shifted. The receiver antennas formed at the shifted positions may be referred to as virtual receiver antennas VRx.

That is, a first virtual receiver antenna VRx1 may be formed at a position shifted by the predetermined horizontal interval from a first receiver antenna Rx1 and a second virtual receiver antenna VRx2 may be formed at a position shifted by the predetermined horizontal interval from a second receiver antenna Rx2.

Here, the first virtual receiver antenna VRx1 and the second virtual receiver antenna VRx2 formed in the same horizontal direction as the first receiver antenna Rx1 and the second receiver antenna Rx2 may have a vertical offset at a vertical interval so as to correspond to the first receiver antenna Rx1 and the second receiver antenna Rx2.

Accordingly, the first receiver antenna Rx1, the second receiver antenna Rx2, the first virtual receiver antenna VRx1 and the second virtual receiver antenna VRx2 are formed at a receiver end, and, thus, an extended aperture doubled in horizontal area can be secured. Therefore, it is possible to precisely measure horizontal information about the target object in a long distance and also possible to improve the resolution of the horizontal information.

Further, according to the present disclosure, it is possible to detect the target object through a plurality of receiver antennas Rx1 and Rx2 and a plurality of virtual receiver antennas VRx1 and VRx2 having a vertical offset and also possible to detect and estimate a vertical angle of the target object using a phase difference.

An interpolation unit 260 may form an antenna pattern arranged in the form of a triangle in LaTex within a horizontal area and a vertical area corresponding to the plurality of receiver antennas and the plurality of virtual receiver antennas by applying MIMO virtual array interpolation to the plurality of receiver antennas and the plurality of virtual receiver antennas. By applying the MIMO virtual array interpolation to the plurality of receiver antennas, the interpolation unit 260 can obtain the maximum radiation aperture even with a limited number of receiver channels.

Herein, it is possible to extract a spatial relative distance between a transmitter antenna and a receiver antenna by using the MIMO virtual array interpolation, extract a frequency component signal depending on the distance to the target object and a change in speed of the target object by performing a two dimensional fast Fourier transform on an actually received reception signal and infer a signal of a non-existing virtual antenna from the extracted frequency component signal by using information about power and phase of a frequency of the target object.

Figure 6A:
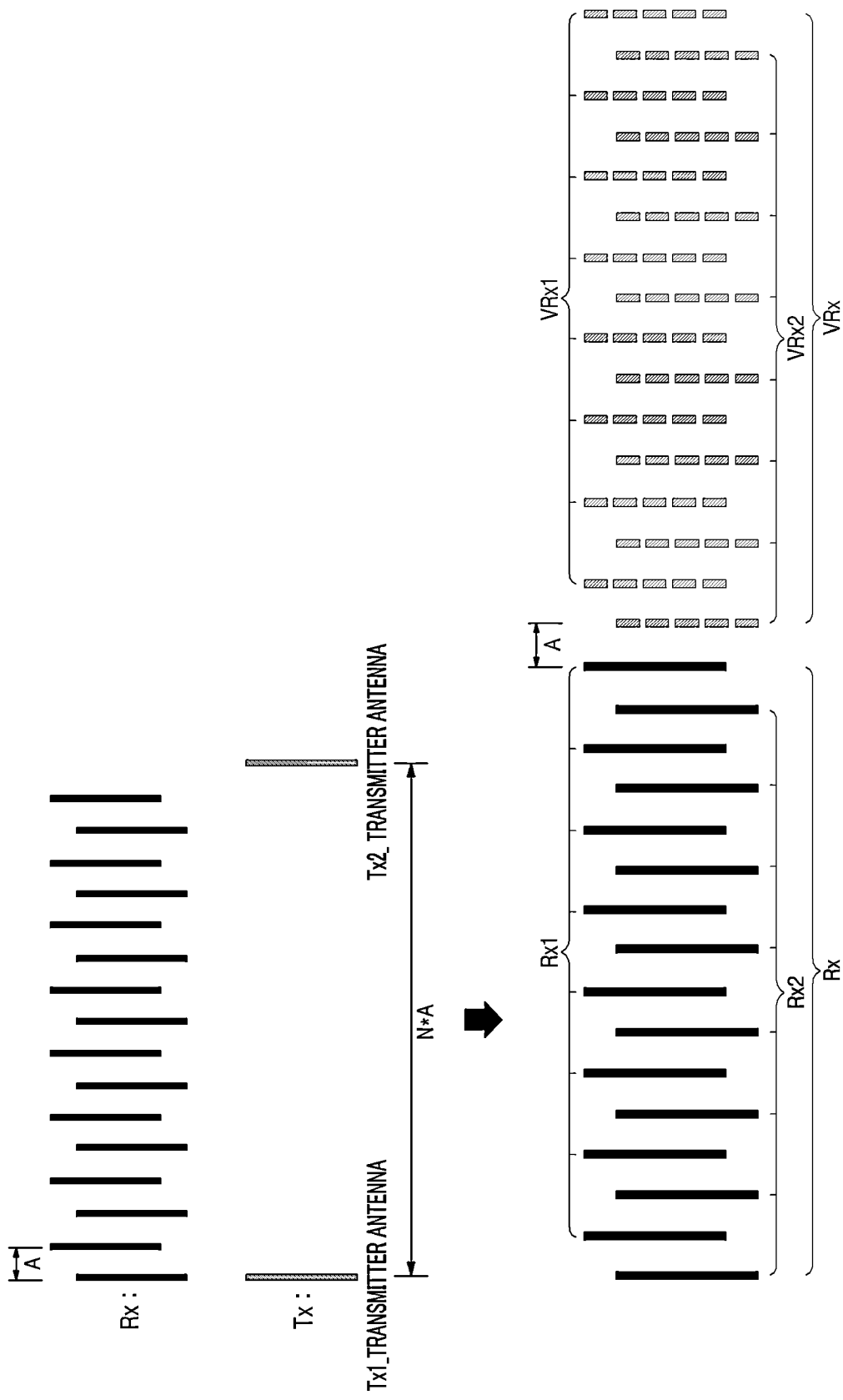
FIG. 6A shows an equivalent state diagram depending on the antenna array configuration of FIG. 3A in accordance with an embodiment of the present disclosure.

FIG. 6A illustrates virtual receiver antennas VRx formed when a transmitter antenna of the first transmitter antenna group Tx1 and a transmitter antenna of the second transmitter antenna group Tx2 perform MIMO operations.

Figure 6B:
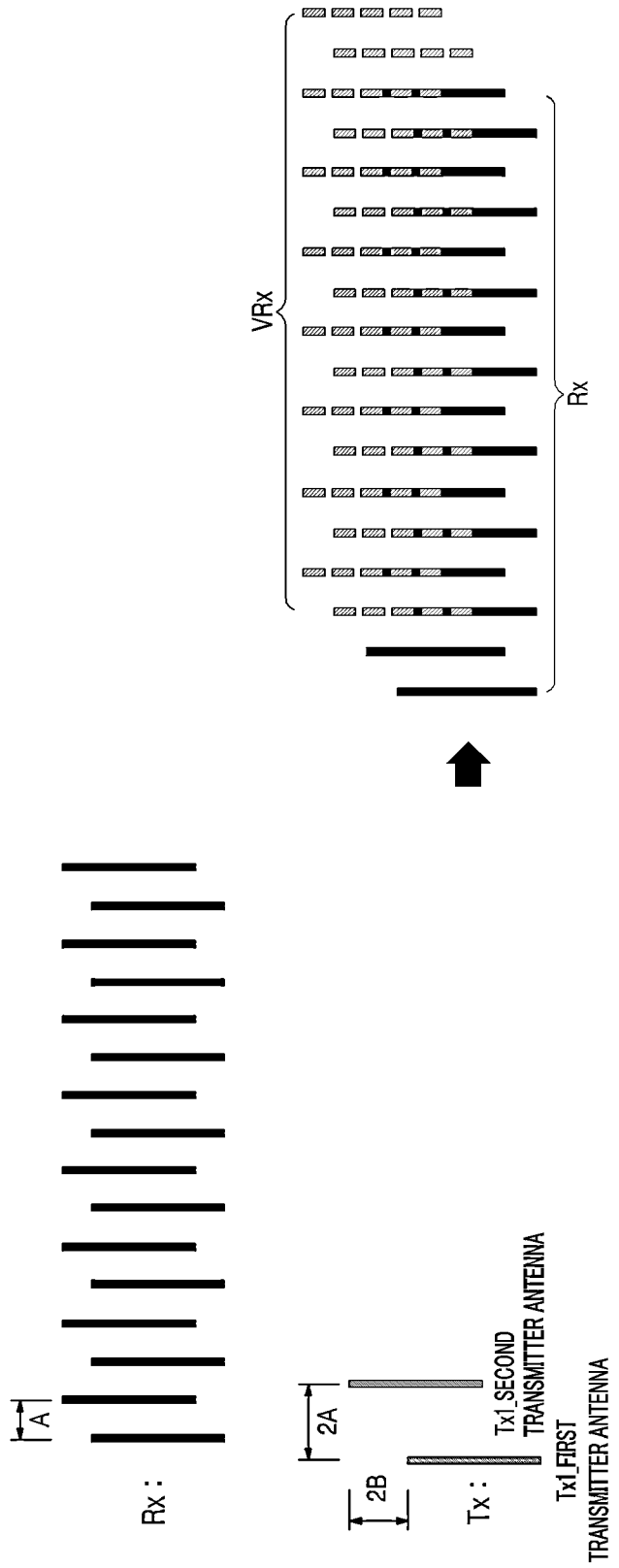
FIG. 6B shows an equivalent state diagram depending on the antenna array configuration of FIG. 3A in accordance with an embodiment of the present disclosure.

FIG. 6B illustrates virtual receiver antennas VRx formed when two of a plurality of transmitter antennas included in the first transmitter antenna group Tx1 perform MIMO operations.

Figure 7A:
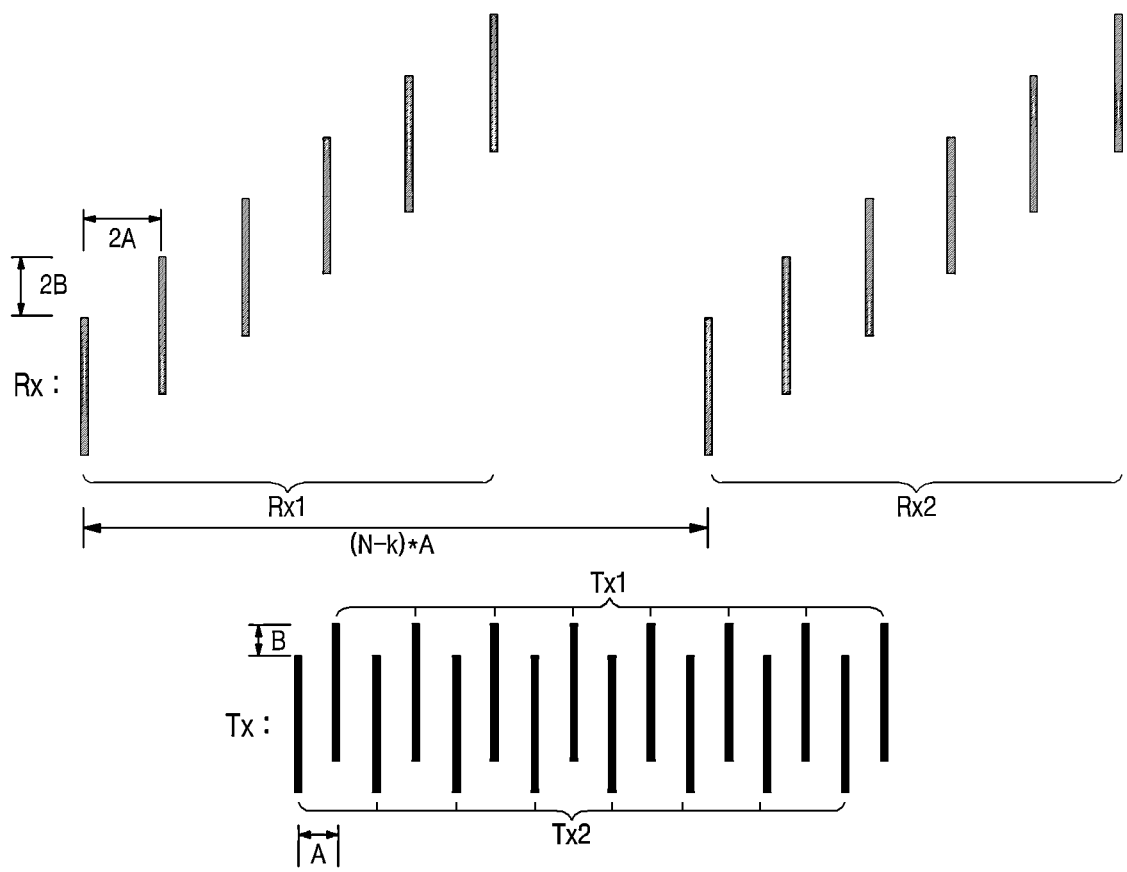
FIG. 7A shows an array configuration of antennas included in the radar and an equivalent state diagram depending on the antenna array configuration in accordance with another embodiment of the present disclosure.
Figure 7B:
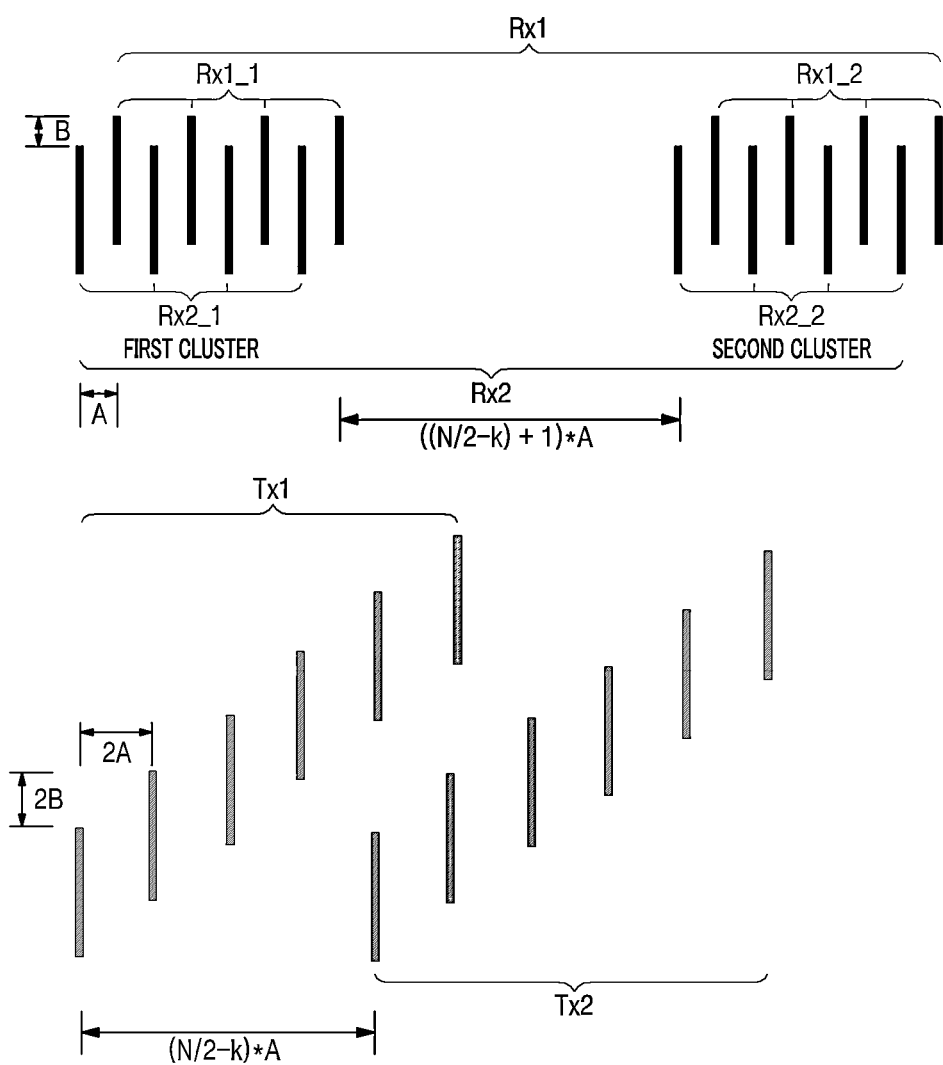
FIG. 7B shows an array configuration of antennas included in the radar and an equivalent state diagram depending on the antenna array configuration in accordance with another embodiment of the present disclosure.
Figure 7C:
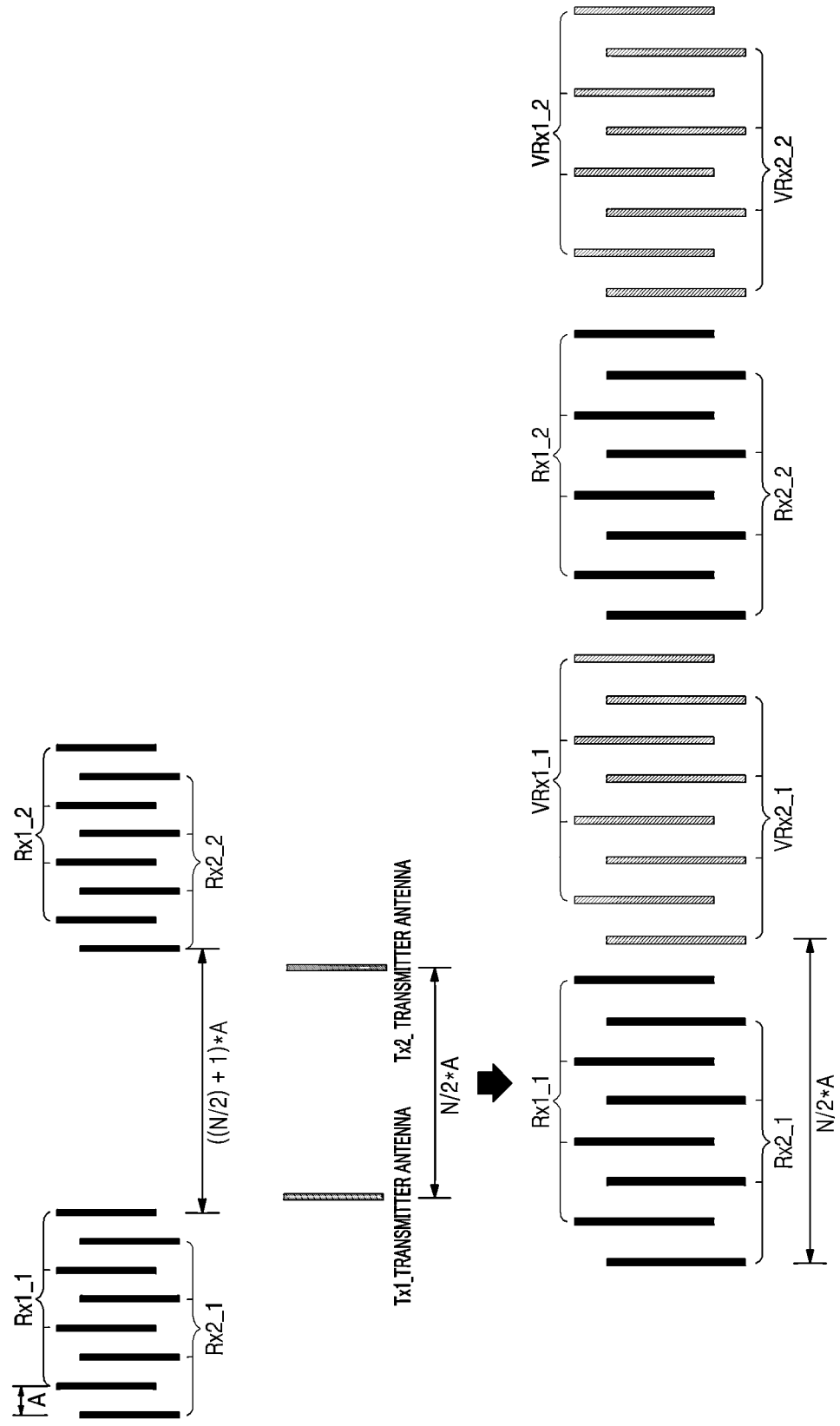
FIG. 7C shows an array configuration of antennas included in the radar and an equivalent state diagram depending on the antenna array configuration in accordance with another embodiment of the present disclosure.

FIG. 7A illustrates a third example of an array configuration of a plurality of transmitter antennas and a plurality of receiver antennas of an antenna device included in the radar 200, FIG. 7B illustrates a fourth example of an array configuration of a plurality of transmitter antennas and a plurality of receiver antennas of an antenna device included in the radar 200 and FIG. 7C illustrates an equivalent state diagram depending on the antenna array configuration of FIG. 7B.

The third example of the antenna array configuration shown in FIG. 7A has an array of transmitter antennas and an array of receiver antennas which are reversed from those in the first example of the antenna array configuration shown in FIG. 3A. That is, the array of transmitter antennas in the first example may correspond in pattern to the array of transmitter antennas in the third example, and the array of receiver antennas in the first example may correspond in pattern to the array of receiver antennas in the third example. As such, the present disclosure suggests an antenna array configuration that can be used for both transmitter antennas and receiver antennas. Therefore, an antenna array configuration and a signal processing operation of the third example can be performed as in the first example with reference to the above-described antenna array configuration and operation of the first example.

Herein, FIG. 7A illustrates an antenna array configuration changed from the array of the plurality of transmitter antennas included in the transmitter antenna unit 210 and the plurality of receiver antennas included in the receiver antenna unit 220 shown in FIG. 3A.

Referring to FIG. 7A, the transmitter antenna unit 210 may include the first transmitter antenna group Tx1 and the second transmitter antenna group Tx2 arranged based on the first horizontal interval. Here, transmitter antennas included in the first transmitter antenna group Tx1 and transmitter antennas included in the second transmitter antenna group Tx2 may be alternately arranged at an interval from each other.

A transmitter antenna of the first transmitter antenna group Tx1 and a transmitter antenna of the second transmitter antenna group Tx2 arranged adjacent to each other may be arranged based on the second horizontal interval. Here, the second horizontal interval may be at least half of the first horizontal interval.

The transmitter antenna of the first transmitter antenna group Tx1 and the transmitter antenna of the second transmitter antenna group Tx2 arranged adjacent to each other may be arranged to have a vertical offset based on the second vertical interval.

The receiver antenna unit 220 may include the first receiver antenna group Rx1 and the second receiver antenna group Rx2 arranged in the diagonal direction based on the first horizontal interval and the first vertical interval. Here, the first horizontal interval may be at least double of the second horizontal interval and the first vertical interval may be at least double of the second vertical interval.

Referring to FIG. 7B, the transmitter antenna unit 210 may be composed of the first transmitter antenna group Tx1 and the second transmitter antenna group Tx2 arranged in the diagonal direction based on the first horizontal interval 2*A and the first vertical interval 2*B. Here, the first transmitter antenna group Tx1 and the second transmitter antenna group Tx2 may be arranged at an interval from each other based on the number of the receiver antennas Rx1 and Rx2 and the first horizontal interval. For example, an interval between the first transmitter antenna group Tx1 and the second transmitter antenna group Tx2 may be calculated based on Equation 2.

$$\text{Interval between the transmitter antenna groups } Tx1 \text{ and } Tx2 = (N/2-K)*A \quad \text{[Equation 2]}$$

Herein, N represents the number of receiver antennas included in the receiver antenna unit 220, K represents the error compensation constant and A represents the first horizontal interval/2.

The receiver antenna unit 220 may include the first receiver antenna group Rx1 and the second receiver antenna group Rx2. Specifically, any one receiver antenna sub-group Rx1_1 included in the first receiver antenna group Rx1 and any one receiver antenna sub-group Rx2_1 included in the second receiver antenna group Rx2 may be alternately arranged to form a first cluster.

Another receiver antenna sub-group Rx1_2 included in the first receiver antenna group Rx1 and another receiver antenna sub-group Rx2_2 included in the second receiver antenna group Rx2 may be alternately arranged to form a second cluster.

The receiver antennas Rx1_1 and Rx2_1 included in the first cluster and the receiver antennas Rx1_2 and Rx2_2 included in the second cluster may be arranged at an interval from each other based on the number of receiver antennas included in the receiver antenna unit 220, the error compensation constant and the first horizontal interval.

The receiver antennas Rx1_1 and Rx2_1 included in the first cluster and the receiver antennas Rx1_2 and Rx2_2 included in the second cluster may be arranged at an interval from each other further based on an interval compensation constant.

For example, an interval between the first cluster and the second cluster may be calculated based on Equation 3.

$$\text{Interval between the first cluster and the second cluster} = (N/2-K)+1)*A \quad \text{[Equation 3]}$$

Herein, N represents the number of receiver antennas included in the receiver antenna unit 220, K represents the error compensation constant, +1 represents the interval compensation constant and A represents the first horizontal interval/2. The interval compensation constant may be a constant for maintaining the continuity of array configuration of antennas arranged in a zigzag pattern and suppressing a physical overlap between the first cluster and the second cluster.

A change in antenna array as shown in FIG. 7B may result in an increase in space efficiency.

Referring to FIG. 7C, if the error compensation constant K is set to zero, when a transmitter antenna of the first transmitter antenna group Tx1 and a transmitter antenna of the second transmitter antenna group Tx2 perform MIMO operations, a plurality of virtual receiver antennas VRx1_1, VRx1_2, VRx2_1 and VRx2_2 may be formed.

Figure 8A:
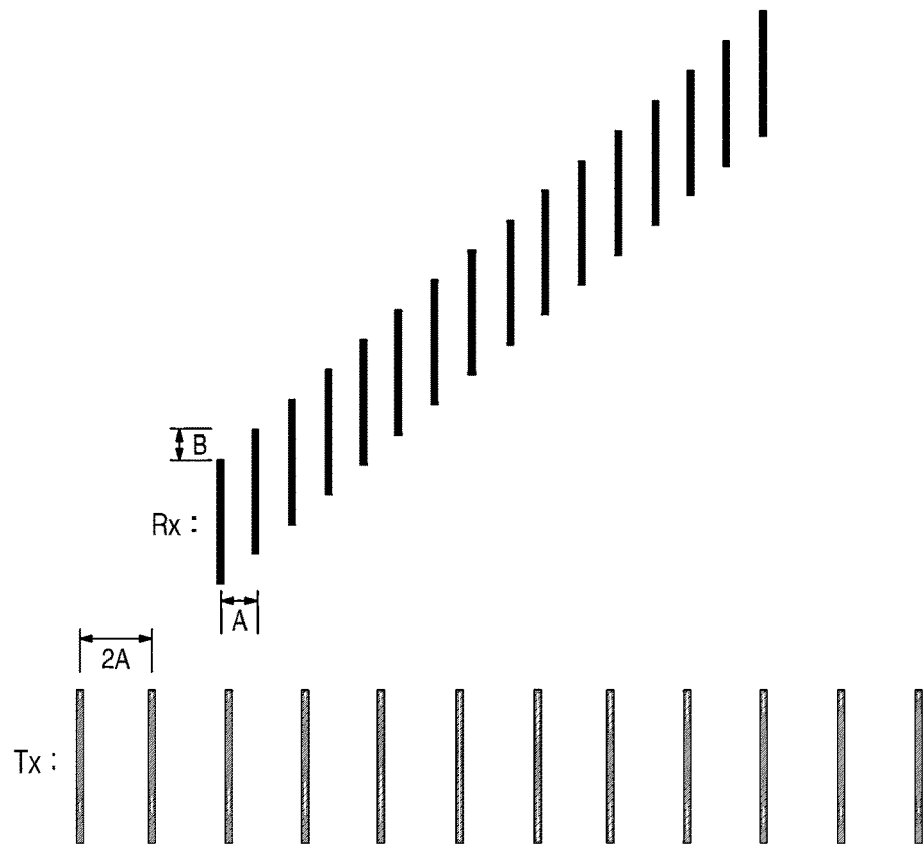
FIG. 8A shows an array configuration of antennas included in the radar in accordance with another embodiment of the present disclosure.
Figure 8B:
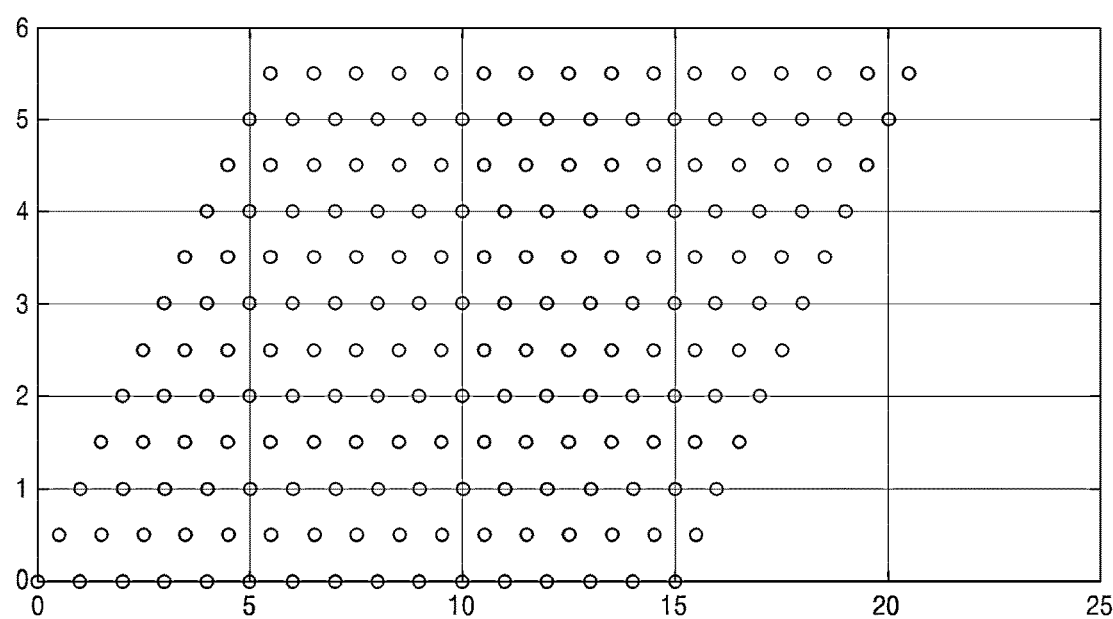
FIG. 8B shows a planar array depending on the antenna array configuration in accordance with another embodiment of the present disclosure.
Figure 8C:
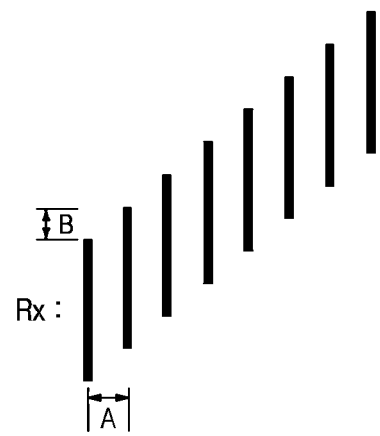
FIG. 8C shows an equivalent state diagram depending on the antenna array configuration in accordance with another embodiment of the present disclosure.
Figure 8C:
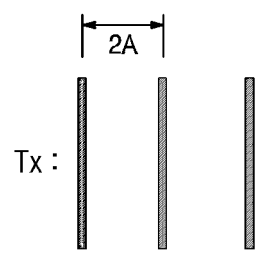
Figure 8C:
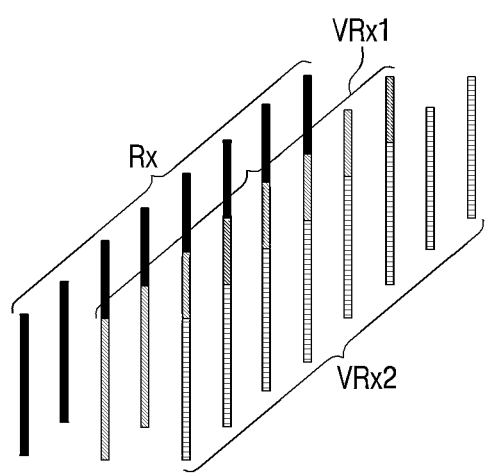
Figure 8D:
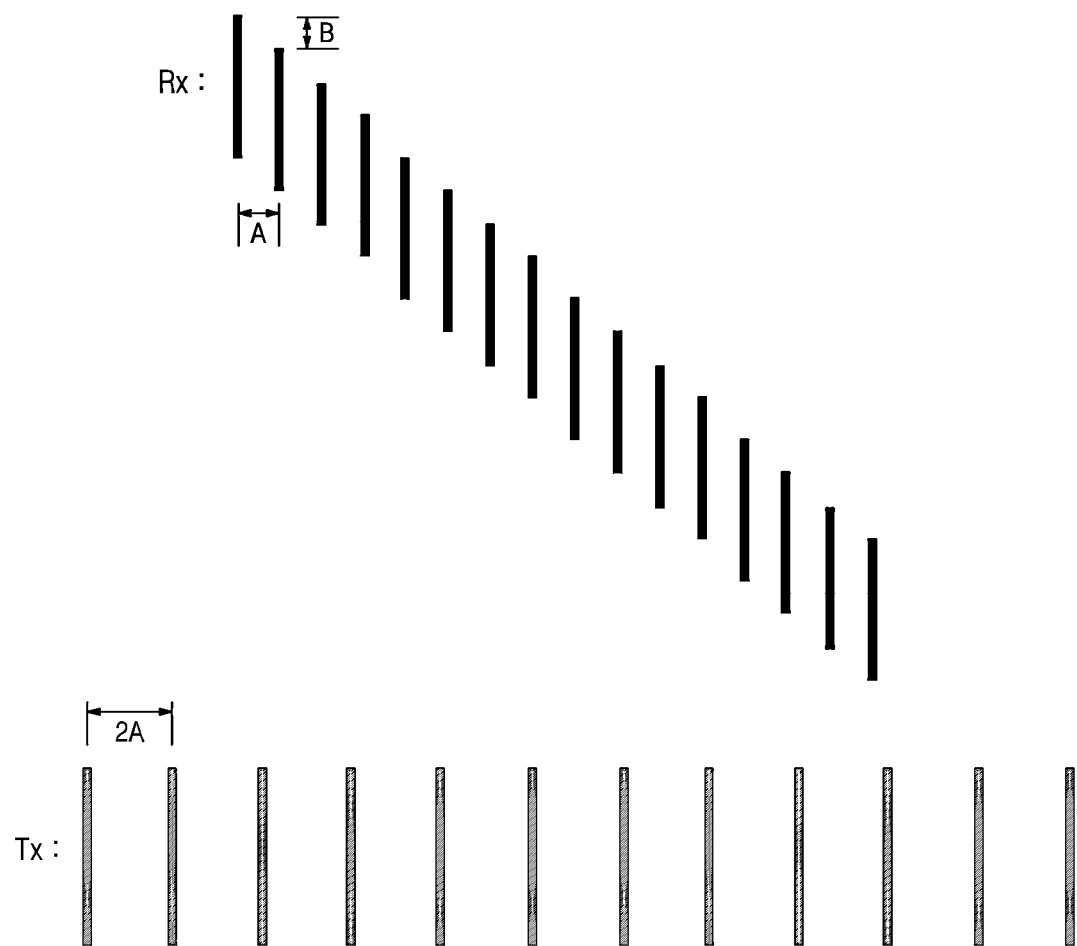
FIG. 8D show an array configuration of antennas included in the radar in accordance with another embodiment of the present disclosure.

FIG. 8A illustrates a fifth example of an array configuration of a plurality of transmitter antennas and a plurality of receiver antennas of an antenna device included in the radar 200, FIG. 8B illustrates a planar array depending on the antenna array configuration of FIG. 8A, FIG. 8C illustrates an equivalent state diagram depending on the antenna array configuration of FIG. 7A and FIG. 8D illustrates a sixth example of an array configuration of a plurality of transmitter antennas and a plurality of receiver antennas of an antenna device included in the radar 200. The fifth example of the antenna array configuration may have an array of transmitter antennas and an array of receiver antennas which are reversed in pattern from those in the sixth example of the antenna array configuration as in the first example and the third example.

Referring to FIG. 8A, the transmitter antenna unit 210 may include a plurality of transmitter antennas Tx arranged at the first horizontal interval 2*A on the same line.

The receiver antenna unit 220 may include a plurality of receiver antennas Rx arranged in a first diagonal direction based on the second horizontal interval A and the second vertical interval B.

In the antenna array pattern of the radar 200 as shown in FIG. 8A, the transmitter antenna unit 210 and the receiver antenna unit 220 can be arranged not to overlap with each other.

If MIMO operations are performed through the antenna array configuration shown in FIG. 8A, the planar antenna array configuration shown in FIG. 8B can be formed. Referring to FIG. 8B, the planar antenna array is configured as a series of triangular lattices.

Referring to FIG. 8C, when a first transmitter antenna, a second transmitter antenna and a third transmitter antenna among a plurality of transmitter antennas Tx perform MIMO operations, a plurality of virtual receiver antennas VRx1 and VRx2 may be formed.

Referring to FIG. 8D, the transmitter antenna unit 210 the transmitter antenna unit 210 may include a plurality of transmitter antennas Tx arranged at the first horizontal interval 2*A on the same line.

The receiver antenna unit 220 may include a plurality of receiver antennas Rx arranged in a second diagonal direction based on the second horizontal interval A and the second vertical interval B.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A radar, comprising:
   a transmitter antenna unit including a plurality of transmitter antennas arranged in a diagonal direction based on a first horizontal interval and a first vertical interval;
   a receiver antenna unit including a first receiver antenna group and a second receiver antenna group arranged based on the first horizontal interval, wherein the first receiver antenna group and the second receiver antenna group are arranged differently from each other in a vertical position;
   a transceiver configured to transmit a transmission signal through the transmitter antenna unit and receive a reflection signal reflected from a target object through the receiver antenna unit; and
   a processing unit configured to extract information about the target object by processing the received reflection signal.

2. The radar of claim 1,
   wherein the transmitter antenna unit includes at least two transmitter antenna groups and each of the transmitter antenna groups includes a plurality of transmitter antennas arranged in the diagonal direction based on the first horizontal interval and the first vertical interval, and
   transmitter antenna groups respectively included in the at least two transmitter antenna groups are arranged at an interval from each other based on the number of receiver antennas included in the receiver antenna unit and the first horizontal interval.

3. The radar of claim 2,
   wherein the at least two transmitter antenna groups are arranged at the interval from each other further based on an error compensation constant, and
   the error compensation constant is a natural number.

4. The radar of claim 3,
   wherein if the error compensation constant is an even number equal to or greater than a threshold value determined based on the number of receiver antennas included in the receiver antenna unit and the number of transmitter antennas included in the transmitter antenna unit, at least two transmitter antennas respectively included in different transmitter antenna groups overlap in position with each other.

5. The radar of claim 4,
   wherein the processing unit performs error compensation on the received reflection signal based on signals received by the at least two overlapping transmitter antennas.

6. The radar of claim 1,
   wherein at least one receiver antenna included in the first receiver antenna group and at least one receiver antenna included in the second receiver antenna group are alternately arranged.

7. The radar of claim 6,
   wherein the receiver antenna included in the first receiver antenna group and the receiver antenna included in the second receiver antenna group are arranged adjacent to each other at a second horizontal interval.

8. The radar of claim 7,
   wherein the first horizontal interval is at least double of the second horizontal interval.

9. The radar of claim 6,
   wherein the receiver antenna included in the first receiver antenna group and the receiver antenna included in the second receiver antenna group are arranged adjacent to each other to have a vertical offset based on a second vertical interval.

10. The radar of claim 9,
    wherein the first vertical interval is at least double of the second vertical interval.

11. The radar of claim 6,
    wherein any one receiver antenna sub-group included in the first receiver antenna group and any one receiver antenna sub-group included in the second receiver antenna group are alternately arranged to form a first cluster, and
    another receiver antenna sub-group included in the first receiver antenna group and another receiver antenna sub-group included in the second receiver antenna group are alternately arranged to form a second cluster.

12. The radar of claim 11,
    wherein a receiver antenna included in the first cluster and a receiver antenna included in the second cluster are arranged at an interval based on the number of receiver antennas included in the receiver antenna unit, an error compensation constant and the first horizontal interval.

13. The radar of claim 12,
    wherein the receiver antenna included in the first cluster and the receiver antenna included in the second cluster are arranged at the interval from each other further based on an interval compensation constant.

* * * * *